July 19, 1966    J. KOOI ETAL    3,261,553
OSCILLATING LAWN SPRINKLER

Filed Oct. 5, 1964    3 Sheets-Sheet 1

Inventors
Jan Kooi
Reginald M. Werlich
By Cushman, Darby & Cushman
Attorneys

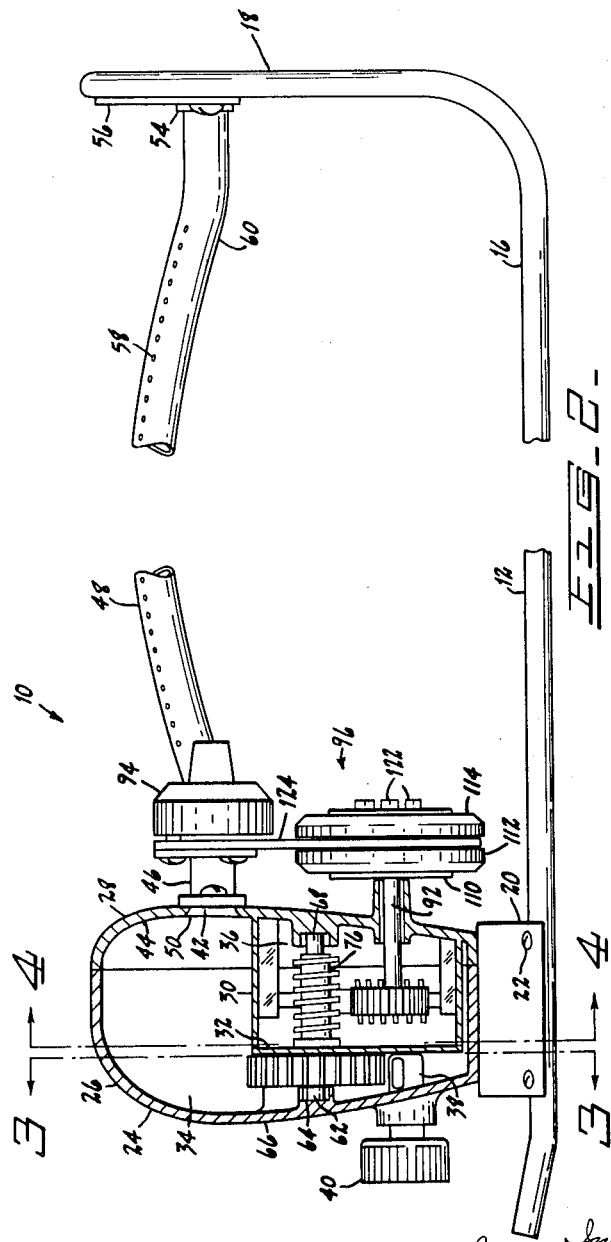

July 19, 1966  J. KOOI ETAL  3,261,553
OSCILLATING LAWN SPRINKLER
Filed Oct. 5, 1964  3 Sheets-Sheet 3
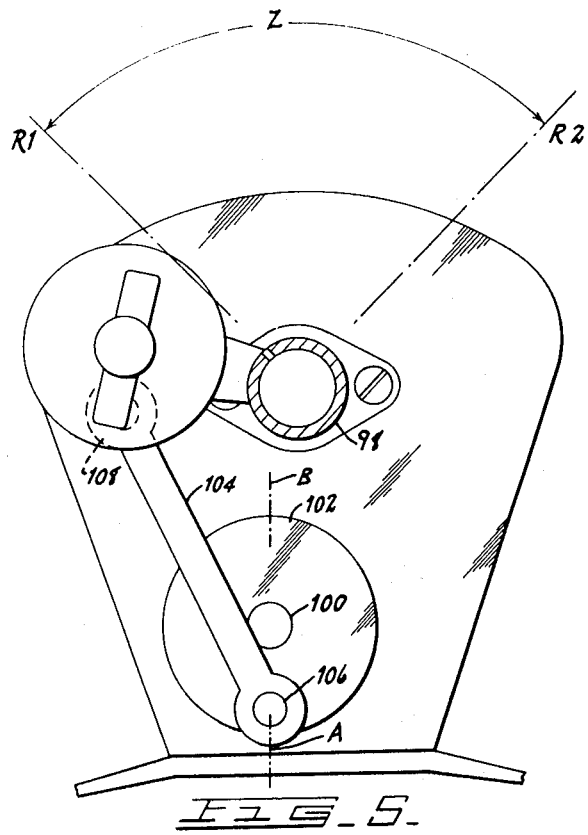
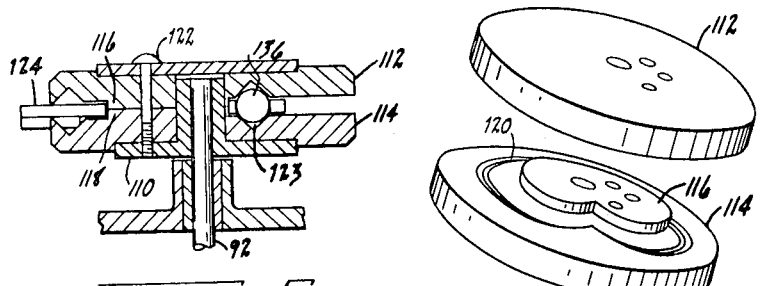
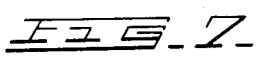

United States Patent Office 3,261,553
Patented July 19, 1966

3,261,553
OSCILLATING LAWN SPRINKLER
Jan Kooi, Kitchener, Ontario, and Reginald M. Werlich, Preston, Ontario, Canada, assignors to Hahn Brass Limited, New Hamburg, Canada
Filed Oct. 5, 1964, Ser. No. 401,340
Claims priority, application Canada, Mar. 26, 1964, 898,938
5 Claims. (Cl. 239—242)

This invention relates to water sprinkling devices and in particular to water or lawn sprinklers of the oscillating or wave type.

Wave type sprinklers, per se, are well known in the art and usually comprise a housing from which a spray tube or sprinkler head extends, together with drive means for the latter in the form of a water driven gear train terminating in an output shaft which is connected to the spray tube by means of a crank arm or connecting link.

The main disadvantage of known wave type sprinklers is that rotation of the output shaft and crank arm imparts a relatively harmonic movement to the spray tube thereby to oscillate the latter back and forth, the result being that a substantially greater amount of water is deposited at the extreme ends of a spray pattern than at the central part thereof. The conventional spray or wave pattern can, therefore, have damaging results especially with respect to a newly sown lawn where extreme puddling of water gathers at the ends of the wave pattern sometimes washing away freshly planted seed.

The object of the present invention is to provide a wave type sprinkler having an improved means of linkage between the driven output shaft and the spray tube resulting in a substantially uniform distribution of water over a predetermined area.

According to its broadest aspect, the present invention relates to an oscillatable wave type lawn sprinkler having a housing and frame, an arbor on said frame remote from said housing, a water spray tube pivotally mounted between said housing and said arbor, fluid actuated drive means in said housing including an output shaft extending therefrom and motion linkage interconnecting said spray tube and said shaft adapted to transmit oscillatory movement to said spray tube in response to rotation of said shaft; said motion linkage including means concentrically mounted on said output shaft and formed to define a passageway; a link-arm connected to said spray tube and pivoted at one end to said housing; a portion of said link being retained in said passageway so as to follow the configuration thereof adapted, in response to rotation of said shaft, to cause said link-arm to effect oscillatory movement to said spray tube wherein the speed of said movement is increased at the points of directional change of said spray tube.

The present invention may best be understood with reference to the accompanying drawings in which:

FIGURE 2 is a sectional view taken along the line 2—2 of FIGURE 1;

Figures 3, 4:
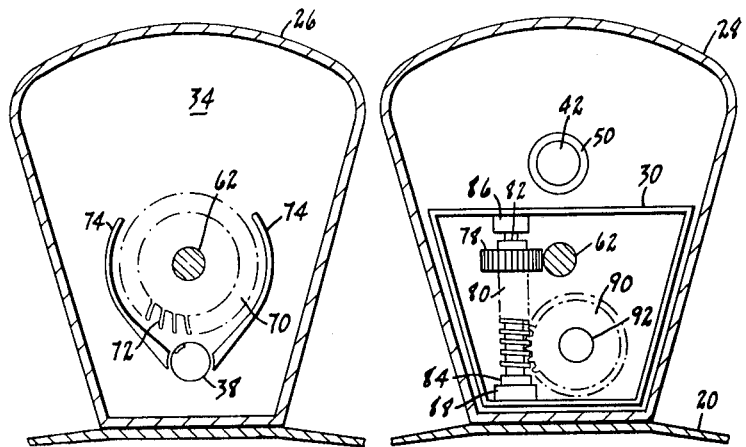
Figure 1:
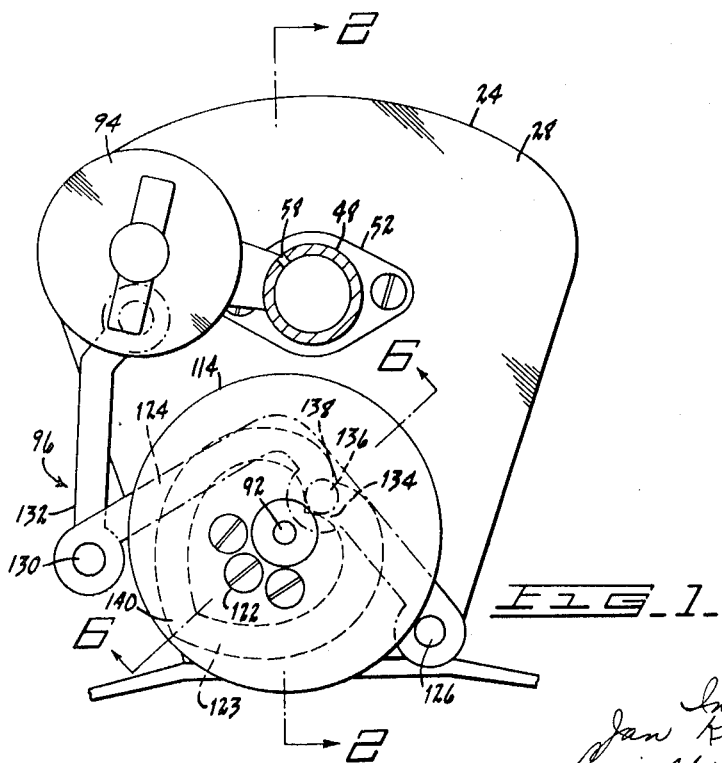
FIGURE 1 is an end elevation, partly sectioned, of a sprinkler of the type forming the present invention.

FIGURE 3 appears on the same sheet of FIGURE 1 and is a sectional view of the sprinkler housing taken along line 3—3 of FIGURE 2;

FIGURE 4 also appears on the same sheet as FIGURE 1 and is a sectional view taken along the line 4—4 of FIGURE 2;

FIGURE 5 is an end elevation of a sprinkler incorporating linkage of the prior art;

FIGURE 6 is a cross sectional view of the sprinkler linkage of the present invention, taken along line 6—6 of FIGURE 1; and FIGURE 7 is an exploded view in perspective of the main integers of FIGURE 6.

Referring now to the drawings, and in particular FIGURES 2, 3 and 4 thereof, there is shown a wave type lawn sprinkler generally indicated at 10 which comprises a tubular frame 12 having runner portions 14 and 16 bridged at one end by a vertically disposed support or arbor portion 18. Adjacent the free ends of the runners 14 and 16, the frame 12 is provided with a bridging support plate 20 each end of which is fastened to the runners 14 and 16 by screws 22.

Secured centrally to the support plate 20 is a housing 24 which comprises a main casing 26 and a closure plate 28. As shown in FIGURES 2 and 4, a depending wall structure 30, integral with the closure plate 28, is provided with a detachable partition 32 so as to divide the housing 24 into an impulse chamber 34 and a gear or drive chamber 36.

One end of the impulse chamber is provided with a fluid inlet in the form of a nozzle 38 on the inner wall of the main casing 26. The nozzle extends outwardly from the casing 26 and terminates in a screw-type coupling 40 to which may be attached a conventional garden hose or the like. The other end of the impulse chamber 34 is provided with a fluid outlet in the form of an aperture 42 in the wall 44 of the cover plate 28. One end 46 of a delivery spray tube 48 is disposed in the aperture 42 and is freely seated therein by means of a flared portion 50 and a concentric collar 52 fastened to the outer wall of the closure plate 28. The other end of the spray tube 48 is freely mounted in a bushing 54 provided on a support 56 fastened to the arbor portion 18 of the frame 12. In the conventional manner, the spray tube 48 is provided throughout its length with a plurality of spaced, aligned spray orifices 58 and the tube 48 is bowed as at 60 to provide a divergent path for water that emanates therefrom.

Oscillatory or reciprocating motion must be provided for the spray tube 48 and to this end the sprinkler comprises fluid actuated drive means shown in detail in FIGURES 3 and 4. A drive shaft 62 is mounted for rotation at one end in a bearing 64 in the wall 66 of the main casing 26 and, at its other end, journalled in a bearing 68 in the cover plate 28.

That end of the drive shaft 62 that is disposed in the impulse chamber 34 is provided with an impeller 70 adapted to be rotated by pressure of fluid entering the chamber 34 through the nozzle 38 which is advantageously positioned so as to direct a concentrated spray against blades 72 of the impeller 70. It will be appreciated from reference to FIGURES 2 and 3 that the concentration of fluid spray is greatly assisted by the partition 32 together with a pair of shroud walls 74 depending inwardly into the chamber 34 from the wall 66 of the main casing 26 and which abut the partition 32. As shown in FIGURE 3, the walls 74 extend upwardly and outwardly from the nozzle 38 substantially to enclose circumferentially the impeller 70 to a height corresponding to the top of the partition 32. It will be appreciated, therefore, that the impeller 70 and its associated drive shaft 62 will receive maximum torque from fluid entering the impulse chamber 34, which fluid then passed outwardly from the sprinkler through the spray tube 48.

The drive shaft 62 extends through the partition 32 in the gear chamber 36 and is provided along its length with a first worm gear 76 in mesh with, and adapted to rotate, a crown gear 78 provided on the upper end of a second, vertically disposed wormed shaft 80. As shown in FIGURE 4, shaft 80 is journalled for rotation in bearings 82 and 84 held respectively in cages 86 and 88 formed integral with the wall 30 depending from the cover plate 28. The second wormed shaft 80 meshes with, and is adapted to rotate, a second crown gear 90 secured to one end of an output shaft 92 journalled in the closure plate 28 and which extends outwardly from the sprinkler housing 24 as shown in FIGURE 2. The gear structure described above reduces the high rotational speeds of the impeller 70 and its shaft 62 and transmits the rotation, so reduced, to the output shaft 92.

The sprinkler 10 is provided with a conventional adjusting knob 94 mounted on the spray tube 48 and adapted to increase or decrease the angle through which the spray tube oscillates. The adjusting knob 94 transmits to the spray tube 48 the driving action of the output shaft 92 through the intermediary of motion transmitting linkage generally indicated at 96 in FIGURES 1 and 2.

It has been previously mentioned that spray tubes of conventional sprinklers deposit substantially more water at the extreme ends of the spray pattern than in the center thereof. This irregularity is the result of the type of motion linkage between the output shaft and the spray tube as used in sprinklers of the prior art and illustrated in FIGURE 5 of the drawings.

A spray tube 98 is adapted to be oscillated through a zone or arc Z not normally exceeding 90° and each end of the arc marks the reversing points of the spray tube 98. This 90° movement is converted from a 360° movement of an output shaft 100 by means of an eccentric crank plate 102 and a link arm 104 pivotally connected thereto at 106 and to an adjusting knob 108 secured to the spray tube 98.

Now it will be appreciated from reference to FIGURE 5 that the spray tube 98 completes its full swing to the left and begins to change direction at reversing point R1 when the link arm 104, at the pivot point 106, reaches the bottom dead center A of its stroke. In like fashion, the spray tube 98 completes its full swing to the right and begins to change direction at reversing point R2, of the arc Z, when the link arm 104, at the pivot point 106, reaches the top dead center B of its stroke.

Although the rotational speed of the output shaft 100 and its associated crank plate 102 is constant, the reciprocating speed of the spray tube 98 is relatively constant with respect to the circumferential speed of the arm 104, at the pivot point 106, only when the arm 104 is in its upward or downward stroke. As the arm 104 approaches bottom and top dead centers, A and B, it transmits extremely small movements to the spray tube 98 and, upon reaching center A and B, the transmission of motion from the arm 104 to the spray tube 98 momentarily ceases. This action therefore causes the spray tube 98 to slow down and finally stop at the reversing points R1 and R2 thereby depositing substantially more water on the ground at these points.

In order therefore to provide water spray distribution that is more uniform throughout the spray pattern, it is necessary to increase somewhat the travelling speed of the sprinkler spray tube as it approaches and reaches its reversing points, bearing in mind that the rotational speed of the sprinkler output shaft is to remain constant. Accordingly, the sprinkler 10 of the present invention incorporates motion transmitting linkage indicated generally at 96 in FIGURE 1 and which is shown in greater detail in FIGURES 6 and 7 of the drawings.

The output shaft 92 is provided with motion linkage means comprising a concentrically mounted flywheel 110 to which is secured a pair of discs 112 and 114 each of which is provided with a projecting face 116 and 118 respectively. The surface of each disc, between its rim and the rim of the projecting face 116, is provided with a V-shaped groove 120 of substantially heart-shaped configuration. As shown in FIGURE 6, the discs 112 and 114 are secured together by screws 122 with their projections 116 and 118 in face contacting relation, the grooves 120 being in registry with one another and spaced apart by projections 116 to provide a heart-shaped passageway 123.

A substantially L-shaped link 124 is pivotally connected at one end to a pin 126 provided on a cross bar not shown fastened to the closure plate 28. The other end of the link 124 is pivotally connected at 130 to one end of a connecting rod 132 pivoted at its other end to the spray tube adjusting knob 94. Intermediate its ends, the link 124 is provided with an aperture 134 adapted circumferentially to embrace a follower such as a ball 136 freely seated in the passageway 123 constituted by the V-shaped grooves 120 in the discs 112 and 114. It will be appreciated that by rotating the output shaft 92 and its associated discs 112 and 114, the ball 136 is acted upon by the shoulders of grooves 120 so as to traverse the path of the passageway 123 and that, as the ball 136 is moved radially inwardly or outwardly with respect to the center of the shaft 92 (FIGURE 1), such movement is transmitted to the spray tube 48 through the link 124, connecting rod 132 and adjusting knob 94.

Now for each number of degrees the discs 112 and 114 turn, the ball 136 travels the same unit distance except at the regions of abrupt directional change of the grooves 120, such regions being indicated at 138 and 140, where the speed of the ball 136 is momentarily increased. The regions 138 and 140 correspond to the reversing points of the spray tube 48 during its oscillatory wave action and, as its speed is momentarily increased as it approaches, reaches and leaves the reversing points, the distribution of water is more uniformly deposited over the spray pattern.

In a test effected with a known type of sprinkler incorporating the type of linkage shown in FIGURE 5 of the drawings, the following water deposition was observed, the unit amounts of water having been measured in ounces per square inches of pattern area per hour.

| Water Pressure | Half-Way | Quarter-Way | Extreme Limit or Reversing Point |
|---|---|---|---|
| Normal | .11 | .10 | .21 |

It was observed that, when travelling through top and bottom dead center, the linkage of the prior art sprinkler caused the spray tube momentarily to stop in either of the two extreme limits or reversing points for up to two or three seconds with the consequence that the amount of water deposited at the extreme limit was double that deposited at half-way.

In contradistinction, the sprinkler of the present invention showed the following test.

| Water Pressure | Half-Way | Quarter-Way | Extreme Limit or Reversing Point |
|---|---|---|---|
| Normal | .21 | .21 | .21 |

Thus it will be observed that the water deposition produced by the lawn sprinkler of the present invention is substantially the same with the spray tube in its half-way position, quarter-way position, and either of its two extreme limits. It will also be noted in the above tests that the uniform motion linkage allowed the sprinkler of the present invention to operate at extremely low pressure where the conventional sprinkler came to a full stop.

The embodiments of the invention in which an exclusive property or privilege is claimed are defined as follows:

1. In an oscillatable wave type lawn sprinkler having a housing and a frame, an arbor on said frame remote from said housing, a water spray tube pivotally mounted between said housing and said arbor, fluid actuated drive means in said housing including an output shaft extending therefrom and motion linkage interconnecting said spray tube and said shaft adapted to transmit oscillatory movement to said spray tube in response to rotation of said shaft; said motion linkage including means concentrically mounted on said output shaft and formed to define a passageway; a link arm connected to said spray tube and pivoted at one end to said housing; a portion of said link being retained in said passageway so as to follow the configuration thereof; said passageway being adapted, in response to rotation of said shaft, to cause said link arm to effect oscillatory movement to said spray tube wherein the speed of said movement is increased at the points of directional change of said spray tube.

2. A wave type lawn sprinkler comprising a frame having an arbor at one end and a housing adjacent its other end; said housing having walls defining an impulse chamber and a gear chamber, said impulse chamber having a fluid inlet and outlet; a spray tube pivotally mounted at one end in said fluid outlet and at its other end to said arbor, said spray tube including means to adjust the area of the spray pattern thereof; drive means in said housing comprising an impeller in said impulse chamber mounted for rotation therein on a drive shaft journalled in said housing walls and extending into said gear chamber; reduction gears in said housing and extending outwardly therefrom; and motion linkage interconnecting said output shaft with said spray tube for effecting oscillating movement to said spray tube in response to rotation of said output shaft; said linkage comprising a pair of discs concentrically mounted on said output shaft and having spaced apart portions defining a passageway, a rod connecting said spray tube adjusting means to one end of a link arm pivoted at its other end to said housing, a portion of said link arm being retained in said passageway by a follower freely positioned therein and adapted to traverse the configuration thereof in response to rotation of said output shaft, whereby said spray tube receives oscillatory movement from said link arm and follower conforming to the configuration of said passageway.

3. A wave type lawn sprinkler according to claim 2 wherein said discs are provided on one face with an endless groove therein; said discs being mounted in face to face relation so that said grooves are opposite to and in registry with one another, to form said passageway.

4. A lawn sprinkler according to claim 3 wherein the configuration of said passageway is substantially heart-shaped and said follower is a ball.

5. A motion transmitting linkage adapted for operative connection to a wave type lawn sprinkler having a housing provided with a fluid driven output shaft and an oscillatable spray tube extending outwardly from said housing; said linkage comprising a pair of discs adapted concentrically to be mounted on said output shaft for rotation therewith, each disc of said pair being provided on one face with an endless, heart-shaped groove therein; said discs being connected in face to face relation whereby said grooves are opposite to and in registry with one another to form a heart-shaped passageway between said discs, said passageway having a follower freely seated therein; and a link arm adapted operatively to be connected at one end with said spray tube and at its other end to be pivotally connected to said housing, a portion of said link circumferentially embracing said follower, whereby, in response to rotation of said output shaft, and said discs, said follower and link are adapted to transmit said rotation to said spray tube for oscillatory movement thereof; the heart-shape of said passageway, acting on said follower and link, being adapted to increase the speed of said movement at the points of directional change of said spray tube.

References Cited by the Examiner

UNITED STATES PATENTS

| | | | |
|---|---|---|---|
| 1,362,700 | 12/1920 | Huffman | 74—567 X |
| 1,748,443 | 2/1930 | Dawson | 74—55 |
| 2,540,125 | 2/1951 | Kolks | 74—55 |
| 2,871,723 | 2/1959 | Shephard | 74—567 |
| 2,945,385 | 7/1960 | Nelson | 239—242 X |
| 3,055,595 | 9/1962 | Bohn et al. | 239—242 |
| 3,063,646 | 11/1962 | Ballard | 239—242 |

M. HENSON WOOD, JR., *Primary Examiner.*

V. C. WILKS, *Assistant Examiner.*